Patented Aug. 7, 1934 1,969,056

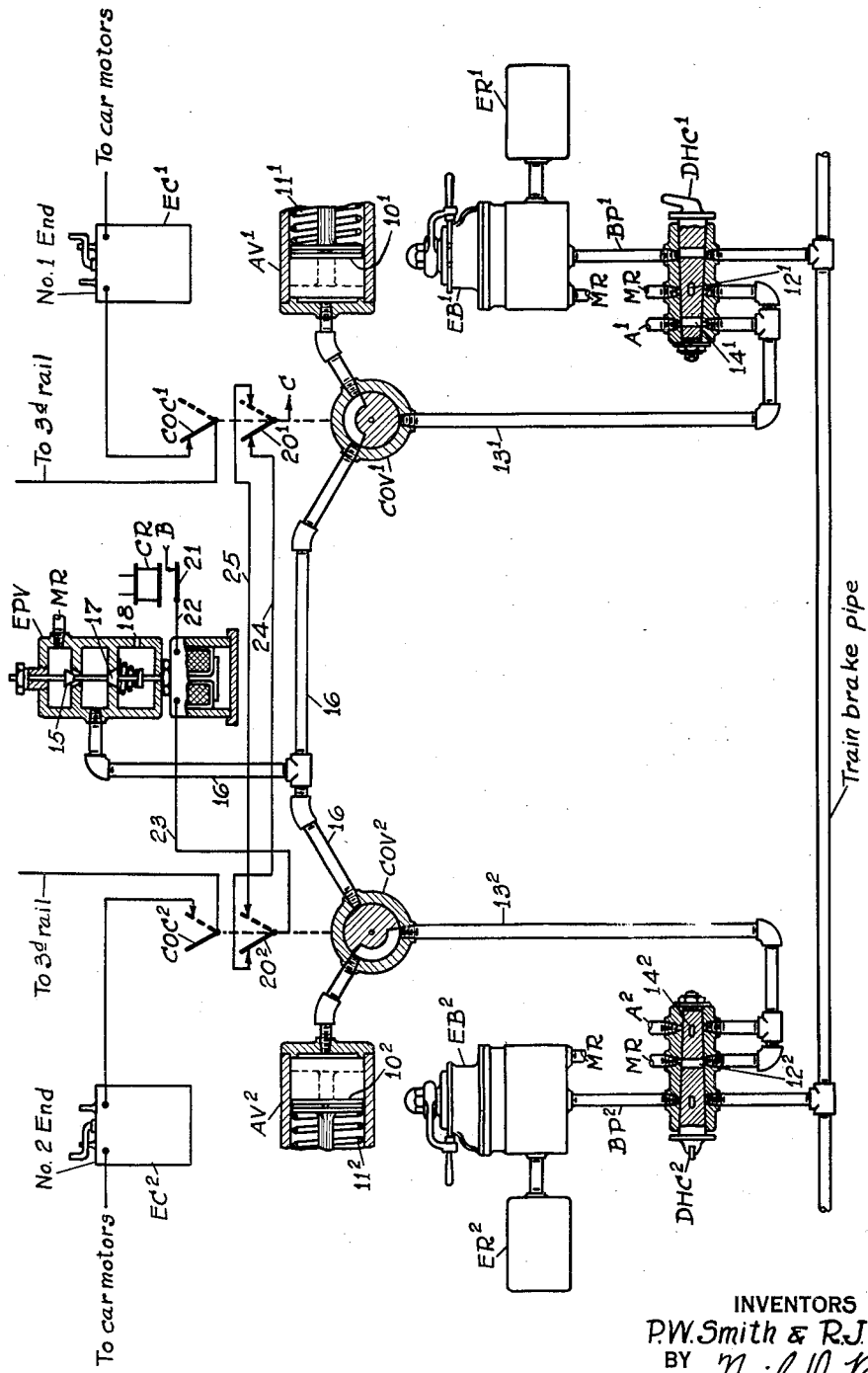

UNITED STATES PATENT OFFICE 1,969,056

AUTOMATIC TRAIN CONTROL SYSTEM

Roswell J. Wolfe and Percy W. Smith, Rochester, N. Y., assignors to General Railway Signal Company, Rochester, N. Y.

Application January 30, 1932, Serial No. 589,896

16 Claims. (Cl. 303—3)

This invention relates to automatic train control systems, and more particularly to such a system when applied to an electrically propelled locomotive or car having brake equipment at each of two ends thereof.

When double brake applying equipments are employed, as one at each end of an electrically propelled locomotive, it is necessary that one of these air brake equipments should be cut out of service and rendered ineffective while the engineer uses the brake equipment at the other end. If an automatic brake control apparatus is superimposed on this manual brake control apparatus, this automatic brake control apparatus must also be cut out at one end of the locomotive and held inactive. If now, provision is made for cutting the automatic brake control apparatus out of service, it is possible for the engineer to misuse this privilege of cutting the apparatus out, and cut it out when he should not do so, thereby allowing the locomotive or car to proceed without automatic brake control protection.

In accordance with the present invention it is proposed to so organize the cut-out features of the automatic brake control apparatus, that the engineer will not cut out the automatic brake control apparatus at that end of the locomotive where the manual brake control apparatus is cut in.

Other objects, purposes and characteristic features of the invention will in part be apparent from the accompanying drawing, and will in part be pointed out more specifically hereinafter.

In describing the invention in detail reference will be made to the accompanying drawing, in which the automatic brake control apparatuses at the two ends of an electrically propelled car or locomotive have been shown conventionally.

Referring to the drawing the application valves $AV^1$ and $AV^2$, are suitably operated brake apppplication valves located in the No. 1 end and the No. 2 end of the electric locomotive, respectively. These application valves are both shown in their normal brake released position, these valves venting air from the brake pipes $BP^1$ and $BP^2$ (in the usual manner, as for example, in the patent to Bushnell 1,818,941 granted August 11, 1931), the usual engineer's brake valves $EB^1$ and $EB^2$, equalizing reservoirs $ER^1$ and $ER^2$ being connected to their brake pipes at a point above the double heading cocks $DHC^1$ and $DHC^2$, respectively. When pressure is released from the flat side of the pistons $10^1$ or $10^2$ of the application valve $AV^1$ and $AV^2$, respectively, an automatic brake application will occur. These application valves $AV^1$ and $AV^2$ have air pressure on the stem side of their pistons $10^1$ and $10^2$ or a spring $11^1$ or $11^2$ for operating them to their dotted brake application position upon release of pressure from the flat side thereof in the same general manner as the valve AV of the above referred to Bushnell Patent 1,818,941 which valve AV operates by main reservoir pressure, to give a brake application, when the valve EPV becomes de-energized to thereby vent one end of the piston cylinder, to atmosphere. These application valves $AV^1$ and $AV^2$ as shown are normally maintained released by main reservoir pressure derived directly from the main reservoir MR through the valve EPV, as shown for valve $AV^1$ in the drawing. These valves $AV^1$ and $AV^2$ may also be held released by main reservoir pressure flowing through the port $12^1$ or $12^2$, as the case may be, of the double heading cock $DHC^1$ or $DHC^2$ through the pipe $13^1$ or $13^2$, as is the case when such double heading cock is in its double heading condition.

This selection of main reservoir pressure fluid for the application valve is accomplished through the medium of cut-out valve $COV^1$ and $COV^2$. These cut-out valves $COV^1$ and $COV^2$ are respectively connected to cut-out contacts $COC^1$ and $COC^2$ which cut-out contacts must assume the proper position for current from the third rail to reach the electric controller $EC^1$ or $EC^2$ and in turn the car motors. As shown in the drawing, the cut-out contact $COC^1$ is in its active position in which the car controller $EC^1$ may control the motors of the car by energy derived from the third rail, whereas the cut-out contactor $COC^2$ is in its ineffective position and removes all electric current from the electric controllers $EC^2$. It is thus seen that if the cut-out valves $COV^1$ or $COV^2$ is placed in its cut-out position the cut-out contactors associated therewith is in its current-off position.

Although the application valves $AV^1$ and $AV^2$ may be controlled in many different ways, they have been shown controlled by an electro-pneumatic valve EPV, which is normally energized to hold the brakes released, and when so energized applies main reservoir pressure from the main reservoir MR through the valve 15 to the pipe 16, and when deenergized connects the pipe 16 to atmosphere through the valve 17 and the opening 18. It is thus seen that if the valve EPV were deenergized with the valve $COV^1$ and $COV^2$ in the position as shown in the drawing, fluid pressure will be vented from the left side of the piston $10^1$ through the valve $COV^1$, the pipe 16, the valve 17 and the openings 18 to atmosphere, thereby resulting in an automatic brake application at the No. 1 end of the electric locomotive. For similar reasons, if the valve $COV^1$ were in the cut-out position and the valve $COV^2$ were in the cut-in position, this same deenergization of the valve EPV would result in the automatic application of the brakes by the application valve $AV^2$.

In order to assure that the engineer will not operate his cut-out contactor and the cut-out valve associated therewith into service at both ends of the locomotive at the same time, the control circuit for the electro-pneumatic valve EPV has been taken through contacts $20^1$ and $20^2$ associated respectively with the cut-out valve $COV^1$ and $COV^2$, in such a manner that these valves $COV^1$ and $COV^2$ must be out of correspondence before one of the two circuits for the electro-pneumatic valve EPV may be rendered available to energize the valve EPV.

As shown in the drawing, the electro-pneumatic valve EPV is energized through the following circuit:—beginning at the terminal B of a suitable source of current, front contact 21 of a suitable control relay CR controlled in accordance with traffic conditions in advance of the locomotive, wire 22, winding of the electro-pneumatic valve EPV, wire 23, contact $20^2$ associated with the cut-out valve $COV^2$, wire 24, contact $20^1$ associated with the valve $COV^1$ to the other terminal C of the same source of current. It will be noted that deenergization of the control relay CR will effect deenergization of the valve EPV and will result in a brake application for reasons heretofore mentioned.

The control relay CR may be controlled in accordance with traffic conditions in advance of the locomotive in any suitable manner as well known to those skilled in the art.

Let us now assume that the engineer wants to control the locomotive from the No. 2 end thereof, and in order to do so operates the cut-out contactor $COC^1$ to its dotted position, operating with it the contact $20^1$ and the valve $COV^1$, and that he thereafter operates the cut-out contactor $COC^2$ to its dotted cut-in position operating with it the contact $20^2$ and the valve $COV^2$. Under this condition of the apparatus the electro-pneumatic valve EPV is energized through the same circuit heretofore traced, except that the wire 25 is included in place of the wire 24. Obviously, under this condition of the valves $COC^1$ and $COC^2$ the device EPV will supply main reservoir pressure to the application valve $AV^2$. Attention is now directed to the fact that if the cut-out contactors $COC^1$ and $COC^2$ were both cut-in or both cut-out at the same time, the device EPV will be deenergized, this because one of the contactors $20^1$ or $20^2$ is in a position to connect to the wire 23 whereas the other contactor is in a position to connect to the wire 25, and the circuit for the valve EPV will be broken. In other words, to establish a circuit for the device EPV the contactors $20^1$ and $20^2$ must be out of correspondence.

The double heading cocks $DHC^1$ and $DHC^2$ constitute well known valves included in the brake pipe between the engineer's brake valve and other associated automatic brake control equipment and the train brake pipe; and are used to prevent the brakes being controlled by the second engine of a double heading combination. It may be pointed out that although these cocks $DHC^1$ and $DHC^2$ have for convenience been called "double heading cocks" they do, as a matter of fact, also serve as cut-out cocks when the locomotive is controlled from the opposite end. For instance, as shown in the drawing the double heading cock $DHC^2$ is performing a cut-out function and not a double heading function although it is assuming a double heading position. It is necessary for this cock $DHC^2$ to assume this double heading position to supply main reservoir pressure to the application valve $AV^2$. It is thus noted that if the cut-out valve $COV^1$ at the No. 1 end of the locomotive is placed in its cut-out position, as could be easily done when the train is moving down grade, for under this condition the motors do not require any power, and the cut-out contact $COC^1$ could for this reason remain open, such movement of the cut-out valve $COV^1$ will not permit the application valve $AV^1$ to be cut out, but will cause an automatic brake application, this because the pipe $13^1$ will be connected to atmosphere through port $14^1$ and pipe $A^1$, and will not be connected to the main reservoir MR for the reason that the double heading cock $DHC^1$ assumes its normal open position. Should, however, the engineer do both operate the cut-out contact $COC^1$ and cut-out valve $COV^1$ to the cut-out position and operate the associated double heading cock $DHC^1$ to the double heading position, the provision of automatic brake control can be nullified, this because under the condition assumed main reservoir pressure can flow from the main reservoir MR, through the valve port $12^1$, through the pipe $13^1$, the cut-out valve $COV^1$, to the application valve $AV^1$. It is, however, conceded by railway signal engineers that no locomotive engineer would ever cut out his double heading cock when power is removed from his electric power controller, this for the reason that he not only cuts out the automatic brake control apparatus but he also cuts out the manual brake control apparatus, thus putting his train and his life in jeopardy.

Having thus shown and described one rather specific embodiment of a brake control system conforming with the present invention, it is desired to be understood that the particular embodiment illustrated has not been selected for the purposes of showing the exact construction preferably employed in practicing the invention, nor has it been shown for illustrating the scope of the invention, but has been illustrated to disclose the underlying principles of the invention and one particular means for carrying out these principles, and it is further desired to be understood that various changes, modifications and additions may be made to adapt the invention to other forms of air brake systems as distinguished from the normally charged brake pipe type as illustrated, without departing from the spirit or scope of the invention or the idea of means underlying the same, except as demanded by the scope of the following claims.

What we claim as new is:—

1. In combination, automatic brake control apparatus on a locomotive, manually operable brake control apparatus, propulsion power control means on said locomotive, a double heading cock for rendering said manually operable brake control apparatus ineffective, means manually operable to render said propulsion power control means ineffective to apply power for propelling said locomotive, and means controlled by the double heading cock for maintaining said automatic brake control apparatus in its brake releasing condition irrespective of automatic control to the contrary and being effective only if both said double heading cock and said means manually operable are in their abnormal condition.

2. In combination, automatic brake control apparatus on a locomotive controlled in accordance with traffic conditions in advance, manually operable brake control apparatus, propulsion power control means on said locomotive, a double heading cock for rendering said manually operable brake control apparatus ineffective, means manually operable to render said propulsion power control means ineffective to apply power for propelling said locomotive and to remove the automatic brake control apparatus from being subject to control by traffic conditions, and means operatively connected to the double heading cock for maintaining said automatic brake control apparatus in its brake releasing condition irrespective of traffic conditions and effective only if both said double heading cock and said means manually operable are in their respective cutting-out condition.

3. In combination with a braking system of the normally charged brake pipe type, an engineer's brake valve, a double heading cock between said engineer's brake valve and the train brake pipe, an application valve for venting the brake pipe automatically, an automatic valve controlled in accordance with traffic conditions in advance for normally charging said application valve to maintain it inactive, and another valve for transferring the control of said application valve from said automatic valve to a normally closed control valve operatively connected to said double heading cock, whereby said application valve may be held inactive irrespective of traffic conditions only if both said double heading cock and said another valve are moved to their abnormal condition.

4. In combination with a braking system of the normally charged brake pipe type, of an engineer's brake valve, a double heading cock between said engineer's brake valve and the train brake pipe, an application valve for venting the brake pipe, an automatic valve controlled in accordance with traffic conditions in advance for normally charging said application valve to maintain it inactive, a cut-out valve for transferring the control of said application valve from said automatic valve to a normally closed valve controlled by said double heading cock, and propulsion power control means effective to control the acceleration of said vehicle only if said cut-out valve is in its normal condition, whereby said application valve may be held inactive irrespective of traffic conditions only if said engineer's brake valve is rendered inactive, and said cut-out valve is moved to take control of the application valve away from the traffic controlled valve.

5. In combination, an electric locomotive, a propulsion power controller at each end of said locomotive, an application valve at each end of said locomotive, an electro-pneumatic valve controlled in accordance with traffic conditions in advance, selecting means for connecting said electro-pneumatic valve to control the application valve having associated therewith a propulsion power controller which is supplied with propulsion energy, and means rendering said electro-pneumatic valve effective to apply the brakes irrespective of traffic conditions if both of the said selecting means are in position to cause both of said propulsion power controllers to be supplied with propulsion energy at the same time.

6. In combination, an electric locomotive, a propulsion power controller at each end of said locomotive, an application valve at each end of said locomotive, an electro-pneumatic valve controlled in accordance with traffic conditions in advance, selecting means for connecting said electro-pneumatic valve to control the application valve having associated therewith a propulsion power controller which is supplied with propulsion energy, and means rendering said electro-pneumatic valve effective to apply the brakes if the selecting means is in position such that the other of said propulsion power controllers is also supplied with propulsion energy.

7. In combination, an electric locomotive, a propulsion power controller at each end on said locomotive, an application valve at each end on said locomotive, a single electro-pneumatic valve controlled in accordance with traffic conditions in advance, selecting means, including power control means, for connecting said electro-pneumatic valve to control an application valve, and also to connect the associated propulsion power controller with propulsion energy, and an energizing circuit for said electro-pneumatic valve closed only if one only of said propulsion power controllers is supplied with propulsion energy by means of said selecting means.

8. In combination, an electric locomotive equipped with an air brake system of the normally charged brake pipe type, a propulsion power controller and an engineer's brake valve at each end on said locomotive, an application valve at each end on said locomotive, a single electro-pneumatic valve controlled in accordance with traffic conditions in advance of said locomotive, an energizing circuit for the electro-pneumatic valve, and controlling means, at each end of the locomotive including associated pressure and power control means so arranged as to permit said electro-pneumatic valve to be energized and cut-in to control that one of said application valves only which has its associated propulsion power controller supplied with propulsion energy by said controlling means providing the other propulsion power controller is cut off from propulsion energy by said controlling means.

9. In combination, an electric locomotive equipped with an air brake system of the normally charged brake pipe type, a propulsion power controller and an engineer's brake valve at each end on said locomotive, an application valve at each end on said locomotive, an electro-pneumatic valve controlled in accordance with traffic conditions in advance of said locomotive, control means for cutting the application valves into control by the electro-magnetic valve and for controlling power to the controllers, and an electric circuit for said electro-pneumatic valve controlled by said control means and closed only to supply fluid pressure to hold one of said application valves released and effective only if the corresponding propulsion power controller only is supplied with propulsion energy by means of said control means.

10. In combination, an electric locomotive equipped with an air brake system of the normally charged brake pipe type, a propulsion power controller and an engineer's brake valve at each end on said locomotive, an application valve at each end on said locomotive, an electro-pneumatic valve, a combined controller including cut-out valve and circuit controller, an electric circuit for said electro-pneumatic valve closed by said combined controller only to supply fluid pressure to hold one of said application valves released, said electric circuit being closed only if the corresponding propulsion power controller only is supplied with propulsion energy by said combined controller, and a relay controlled in accordance with traffic conditions in advance for controlling said circuit.

11. In combination, an electric locomotive equipped with an air brake system of the normally charged brake pipe type, a propulsion power controller and an engineer's brake valve at each end on said locomotive, a double heading cock associated with each engineer's brake valve, an application valve at each end on said locomotive, an electro-pneumatic valve, an energizing electric circuit controlled in accordance with traffic conditions for said electro-pneumatic valve, said electro-pneumatic valve when its circuit is closed, being conditioned to supply fluid pressure to hold said application valves released, control means at each end of the locomotive for connecting the application valve to the electro-pneumatic valve and controlling power supply to the power controllers, and means permitting one of said application valves to be held released irrespective of traffic conditions only if both the control means at that end is moved so that power is cut off of its associated propulsion power controller and the double heading cock associated therewith is placed in its double heading position.

12. In combination, an electric locomotive, a propulsion power controller at each end of said locomotive, an application valve at each end of said locomotive, an electro-pneumatic valve controlled in accordance with traffic conditions in advance, selecting means for connecting said electro-pneumatic valve to control the application valve having associated therewith a propulsion power controller which is supplied with propulsion energy, and circuit means for said electro-pneumatic valve which is opened to make the valve effective to apply the brakes, if the selecting means is in position to cause the other propulsion power controller to be supplied with propulsion energy.

13. In combination, an electric locomotive equipped with an air brake system of the normally charged brake pipe type, a propulsion power controller and an engineer's brake valve at each end on said locomotive, an application valve at each end on said locomotive, a single electro-pneumatic valve controlled in accordance with traffic conditions in advance of said locomotive, an energizing circuit for the electro-pneumatic valve, and controlling means at each end of the locomotive including associated pressure and power control means so arranged as to permit said electro-pneumatic valve to be energized and cut in to control that one of said application valves only which has its associated propulsion power controller supplied with propulsion energy by said controlling means providing the other propulsion power controller is cut off from propulsion energy by said controlling means, and the other application valve is cut out of control by the said controlling means.

14. In an air brake system for locomotives, in combination, an automatic brake actuator, automatic means and manual means for controlling the actuator, a change over valve for placing the actuator under control of either the automatic or the manual means, a double heading cock for cutting the manual means out of service, and means controlled by the double heading cock for causing the actuator, subject to control by said valve, to apply the brakes when the cock is in position to cut the manual means into service.

15. In an air brake system for locomotives, in combination, an automatic brake actuator, automatic means and manual means for controlling the actuator, a change over valve for placing the actuator under control of either the automatic or the manual means, a double heading cock for cutting the manual means out of service, and means controlled by the double heading cock for causing the actuator, subject to control by said valve, to apply the brakes when the cock is in position to cut the manual means into service, a propulsion power controller, and means controlled by the change over valve for cutting power off of the controller.

16. In an air brake system for locomotives, in combination, an automatic brake actuator, automatic means and manual means for controlling the actuator, a change over valve for placing the actuator under control of either the automatic or the manual means, a double heading cock for cutting the manual means out of service, and means controlled by the double heading cock for causing the actuator, subject to control by said valve, to apply the brakes when the cock is in position to cut the manual means into service, a propulsion power controller, and means controlled by the change over valve for cutting power off of the controller, when the valve is in position to place the actuator under control of the automatic means.

ROSWELL J. WOLFE.
PERCY W. SMITH.